US010502381B2

(12) United States Patent
Miyairi

(10) Patent No.: US 10,502,381 B2
(45) Date of Patent: Dec. 10, 2019

(54) LIGHT-EMITTING MODULE AND VEHICLE LAMP

(71) Applicant: NICHIA CORPORATION, Anan-shi, Tokushima (JP)

(72) Inventor: Hiroshi Miyairi, Yokohama (JP)

(73) Assignee: NICHIA CORPORATION, Anan-Shi, Tokushima (JP)

( * ) Notice: Subject to any disclaimer, the term of this patent is extended or adjusted under 35 U.S.C. 154(b) by 0 days.

(21) Appl. No.: 16/135,359

(22) Filed: Sep. 19, 2018

(65) Prior Publication Data

US 2019/0093845 A1 Mar. 28, 2019

(30) Foreign Application Priority Data

Sep. 22, 2017 (JP) ................................ 2017-183071

(51) Int. Cl.
*B60Q 1/00* (2006.01)
*F21S 41/255* (2018.01)
(Continued)

(52) U.S. Cl.
CPC ........... *F21S 41/255* (2018.01); *F21S 41/147* (2018.01); *F21S 41/151* (2018.01); *F21S 41/155* (2018.01); *F21S 41/192* (2018.01); *F21S 41/265* (2018.01); *F21S 41/275* (2018.01); *F21S 41/143* (2018.01); *F21S 45/47* (2018.01)

(58) Field of Classification Search
None
See application file for complete search history.

(56) References Cited

U.S. PATENT DOCUMENTS

2006/0285341 A1* 12/2006 Yatsuda .................. F21S 41/43 362/464
2008/0247188 A1* 10/2008 Woodward ......... G02B 19/0066 362/554

(Continued)

FOREIGN PATENT DOCUMENTS

EP 2280214 A1 2/2011
JP H09-222581 A 8/1997

(Continued)

*Primary Examiner* — Vip Patel
(74) *Attorney, Agent, or Firm* — Birch, Stewart, Kolasch & Birch, LLP

(57) ABSTRACT

A light-emitting module includes a light source unit including light-emitting elements horizontally aligned; a projection lens receiving light emitted from the light source unit, and projecting the light through a light exiting surface of the projection lens in a radiation direction; and a frame body holding the light source unit and the projection lens at predetermined positions. The projection lens comprise a first and second lenses each having the same focal length and curvature, and being disposed adjacently in a vertical direction or as an integrated body. A vertical division ratio of lower one of the first and second lenses to the other one is larger than 1. Optical axes of the first and second lenses differ in the vertical direction. A value in the vertical direction of a horizontal-to-vertical ratio for a light-emitting area of light-emitting elements is smaller than a value in the horizontal direction of a horizontal-to-vertical ratio for the light projected from the projection lens.

14 Claims, 10 Drawing Sheets

(51) Int. Cl.

| | |
|---|---|
| ***F21S 41/265*** | (2018.01) |
| ***F21S 41/151*** | (2018.01) |
| ***F21S 41/275*** | (2018.01) |
| ***F21S 41/147*** | (2018.01) |
| ***F21S 41/155*** | (2018.01) |
| ***F21S 41/19*** | (2018.01) |
| *F21S 41/143* | (2018.01) |
| *F21S 45/47* | (2018.01) |

(56) References Cited

U.S. PATENT DOCUMENTS

| | | | | |
|---|---|---|---|---|
| 2011/0096561 | A1 | 4/2011 | Owada | |
| 2013/0188377 | A1 | 7/2013 | Konishi | |
| 2013/0250599 | A1 | 9/2013 | Owada | |
| 2014/0307458 | A1* | 10/2014 | Brendle | ................ F21S 41/143 362/516 |
| 2015/0300589 | A1 | 10/2015 | Iwasaki | |
| 2016/0377250 | A1 | 12/2016 | Ohno | |

FOREIGN PATENT DOCUMENTS

| | | | |
|---|---|---|---|
| JP | 2013-152813 | A | 8/2013 |
| JP | 2013-200992 | A | 10/2013 |
| JP | 2014-099280 | A | 5/2014 |
| JP | 2015-158986 | A | 9/2015 |
| JP | 2016-081874 | A | 5/2016 |
| JP | 2017-010789 | A | 1/2017 |

* cited by examiner

LIGHT-EMITTING MODULE AND VEHICLE LAMP

CROSS-REFERENCE TO RELATED APPLICATION

This application claims priority to Japanese Patent Application No. 2017-183071, filed on Sep. 22, 2017, the disclosure of which is hereby incorporated by reference in its entirety.

BACKGROUND

The disclosure of the present disclosure relates to a light-emitting module and a vehicle lamp.

Products each including a plurality of LEDs mounted on or above a substrate have already been introduced on the market as light sources for adaptive driving beam (ADB). In this type of headlight, a light source projects light on a plane to be projected to thereby form a predetermined light distribution pattern that is desired. In this headlight, light-emitting elements are arranged to constitute the light source correspondingly to, for example, the horizontal-to-vertical ratio (i.e., aspect ratio), which is the ratio of the length in the horizontal direction (or the angular range from the optical axis) to the length in the vertical direction (or the angular range from the optical axis), of the projected area at the projected position (for example, see Japanese Unexamined Patent Application Publication No. H9-222581).

Also, a module that includes a lens having an adjusted shape and is used as a low-beam module for a vehicle lamp is known (for example, see Japanese Unexamined Patent Application Publication No. 2014-99280). The light exiting surface of the lens in this module is vertically and horizontally divided by vertical division step surfaces and horizontal division step surfaces.

In addition, a vehicle lamp including a light source unit provided with a reflector in combination with a lens that includes concentric portions having different structures has been proposed (for example, see Japanese Unexamined Patent Application Publication No. 2016-81874).

However, the following concerns arises for conventional light-emitting modules or vehicle lamps. That is, a light source including light-emitting elements has the same aspect ratio as the aspect ratio of the projected area on the plane of projection in a conventional light-emitting module or the like, and therefore, the number of light-emitting elements or light-emitting area increases, and it becomes difficult to efficiently light all the light-emitting elements because of the light distribution. Also, employing adjusting the lens shape requires precision in installation as a module for complicated structure, resulting in difficulty in manufacturing and installation. Also, in the case where the light source unit is provided with a reflector, the increased number of optical components needs coordination among a large number of optical components.

Therefore, a certain embodiment according to the present disclosure has an object to provide a light-emitting module that includes a reduced number of light-emitting elements or light-emitting area and a simple optical system and to provide a vehicle lamp.

SUMMARY

To address the above problems, a light-emitting module according to an embodiment of the present disclosure comprises: a light source unit comprising a plurality of light-emitting elements aligned in a horizontal direction; a projection lens receiving light emitted from the light source unit, and projecting the light through a light exiting surface of the projection lens in a radiation direction; and a frame body holding the light source unit and the projection lens at predetermined positions. The projection lens comprises a first lens and a second lens each having a focal length equivalent to each other and a curvature equivalent to each other. The first lens and the second lens are disposed adjacently to each other in a vertical direction or as an integrated body. A ratio of a light exiting surface of lower one of the first lens and the second lens in the vertical direction is larger than a ratio of a light exiting surface of the other one. An angle of an optical axis of the first lens differs from an angle of an optical axis of the second lens in the vertical direction of projection. A value in the vertical direction of a horizontal-to-vertical ratio for a light-emitting area of the light-emitting elements is smaller than a value in the horizontal direction of a horizontal-to-vertical ratio for a projected area projected from the projection lens.

Also, to address the object described above, a vehicle lamp according to an embodiment of the present disclosure includes the light-emitting module as a high-beam module provided separately from a low-beam module.

In the light-emitting module according to the embodiment of the present disclosure, a light source with a small light-emitting area corresponding to the aspect ratio of the projected area is achieved while maintaining contrast between the lit and unlit states on the plane of projection. Also, the optical system of the light-emitting module according to the embodiment of the present disclosure has a simple structure, thereby facilitating the manufacture and installation.

In addition, the vehicle lamp according to the embodiment of the present disclosure includes a light source with a small light-emitting area and a simple optical system, thereby realizing easy adjustment to prescribed conditions and installation.

DETAILED DESCRIPTION OF EMBODIMENTS

Figure 1:
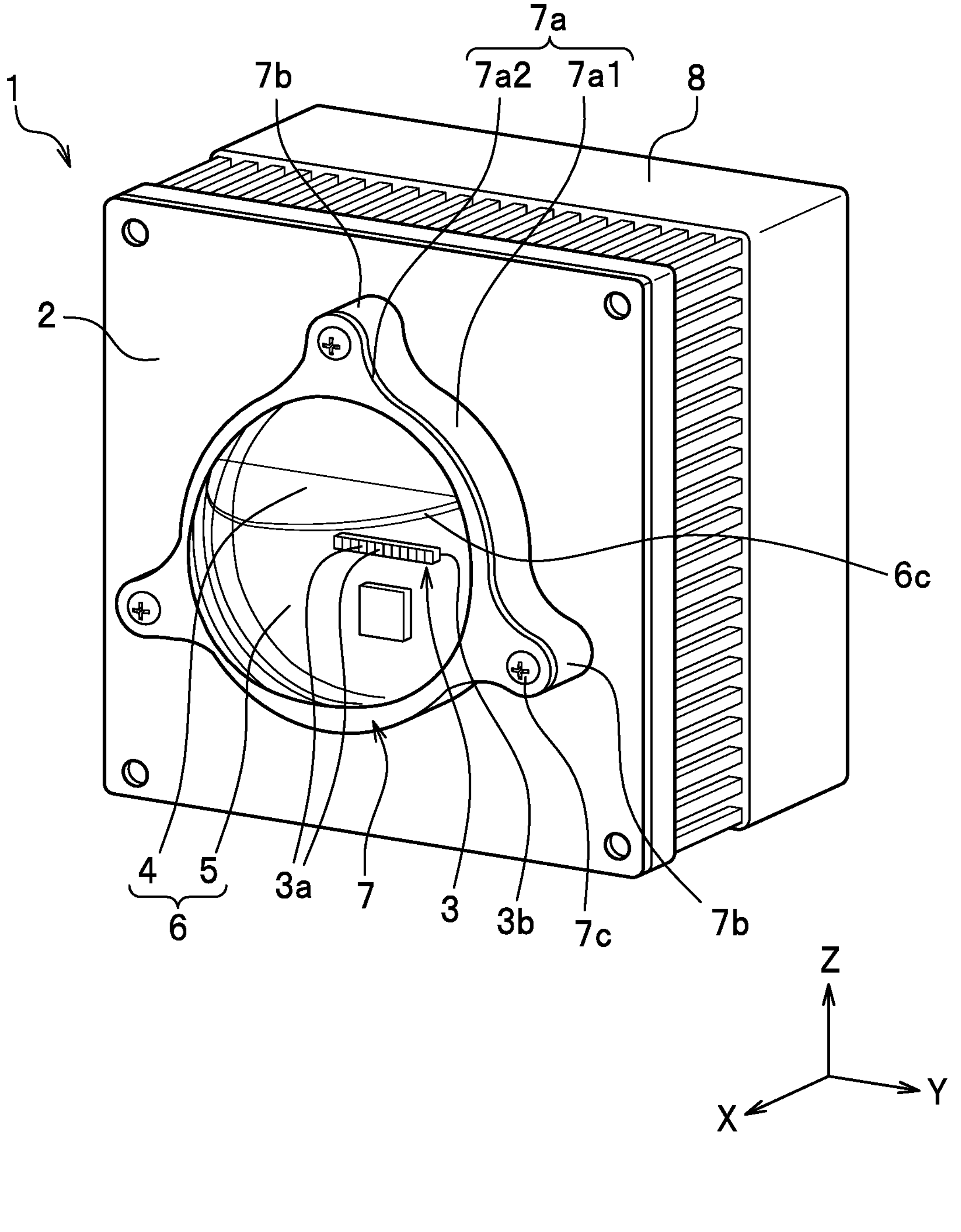
FIG. 1 is a schematic perspective view of a light-emitting module according to a present embodiment.

The following describes an embodiment of the disclosure referring to the accompanying drawings as appropriate. The embodiment described below is intended to embody the technical concept of the present disclosure and does not limit the present disclosure to the followings unless specifically stated otherwise. There is a case where magnitudes or positional relations of members illustrated in the drawings are exaggerated in order to clarify the descriptions. In addition, arrows indicating light in the drawings represent only typical parts of the light.

Figure 3:
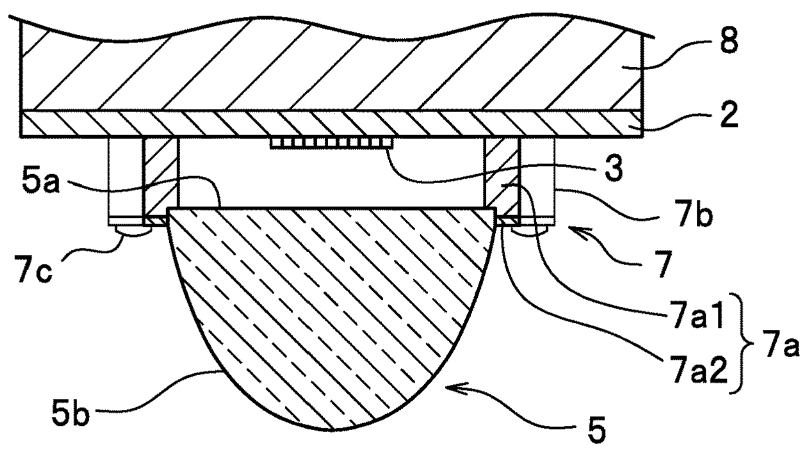
FIG. 3 is a schematic sectional view of the light-emitting module according to the present embodiment taken along the line III-III in FIG. 2.

A light-emitting module 1 radiates light emitted from a light source unit 3 in a light radiation direction through a projection lens 6 as shown in FIG. 1 and FIG. 3. The light-emitting module 1 includes the light source unit 3 that includes light-emitting devices 3*a* aligned in the horizontal direction (i.e., Y direction); the projection lens 6 that is adapted to receive light emitted from the light source unit 3 through an incident surface 6*a*, and to project the light through a light exiting surface 6*b* in a radiation direction; and a frame body 7 that holds the light source unit 3 and the projection lens 6 at predetermined positions. The projection lens 6 includes a first lens 4 and a second lens 5. In the drawings, the light-emitting module 1 includes a heat sink 8.

The following describes the structure of each component in order.

Light Source Unit

Figure 4:
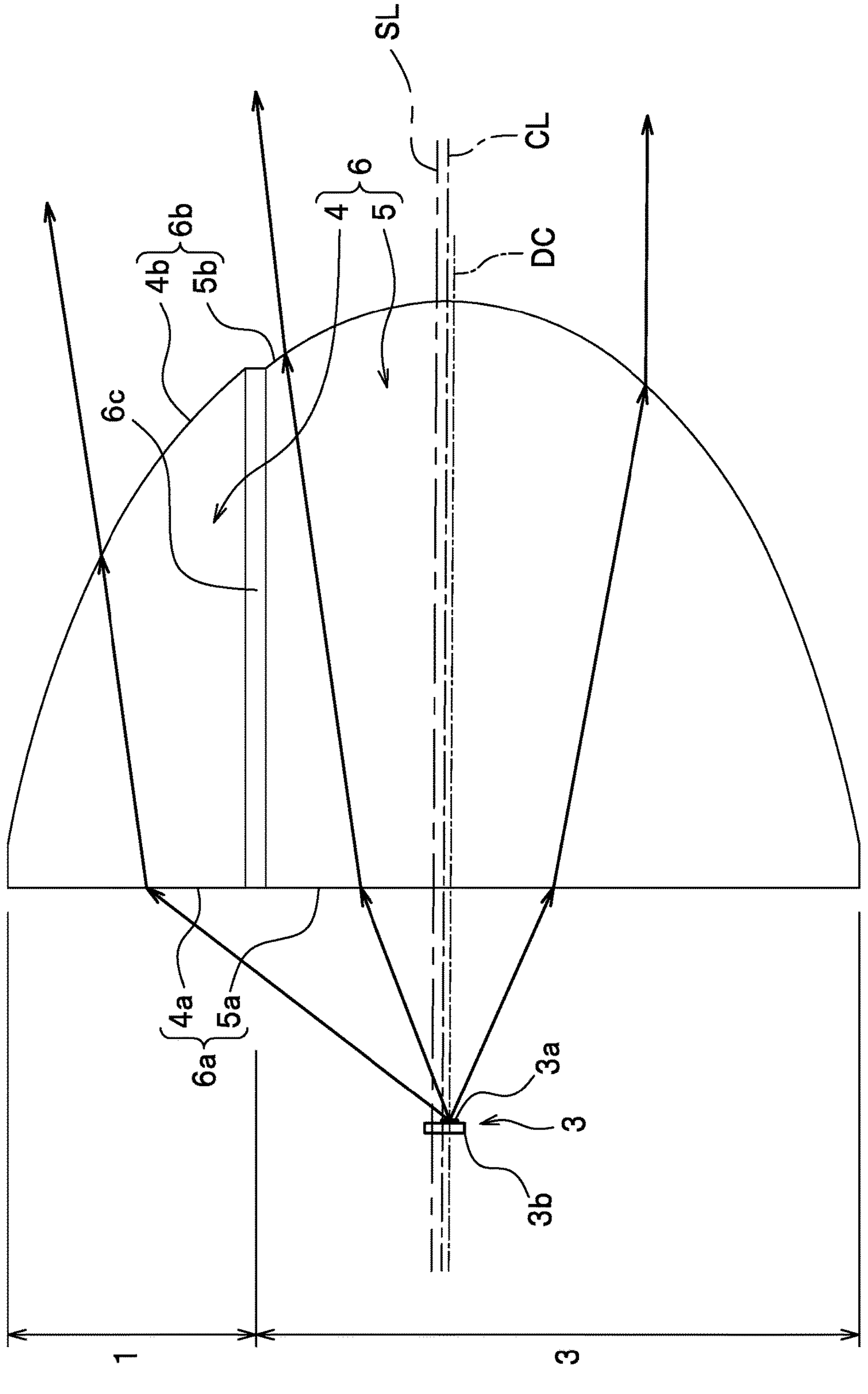
FIG. 4 is a schematic lateral view of a projection lens of the light-emitting module according to the present embodiment.

The light source unit 3 includes, as main components, a mounting board 3*b* mounted on a support substrate 2 and the light-emitting devices 3*a* mounted on or above the mounting board 3*b* as shown in FIG. 1 and FIG. 4. The mounting board 3*b* and the support substrate 2 may be formed as an integrated body in the light source unit 3, or the mounting board 3*b* may be separately formed and mounted on the support substrate 2.

Light-Emitting Devices

Figure 2:
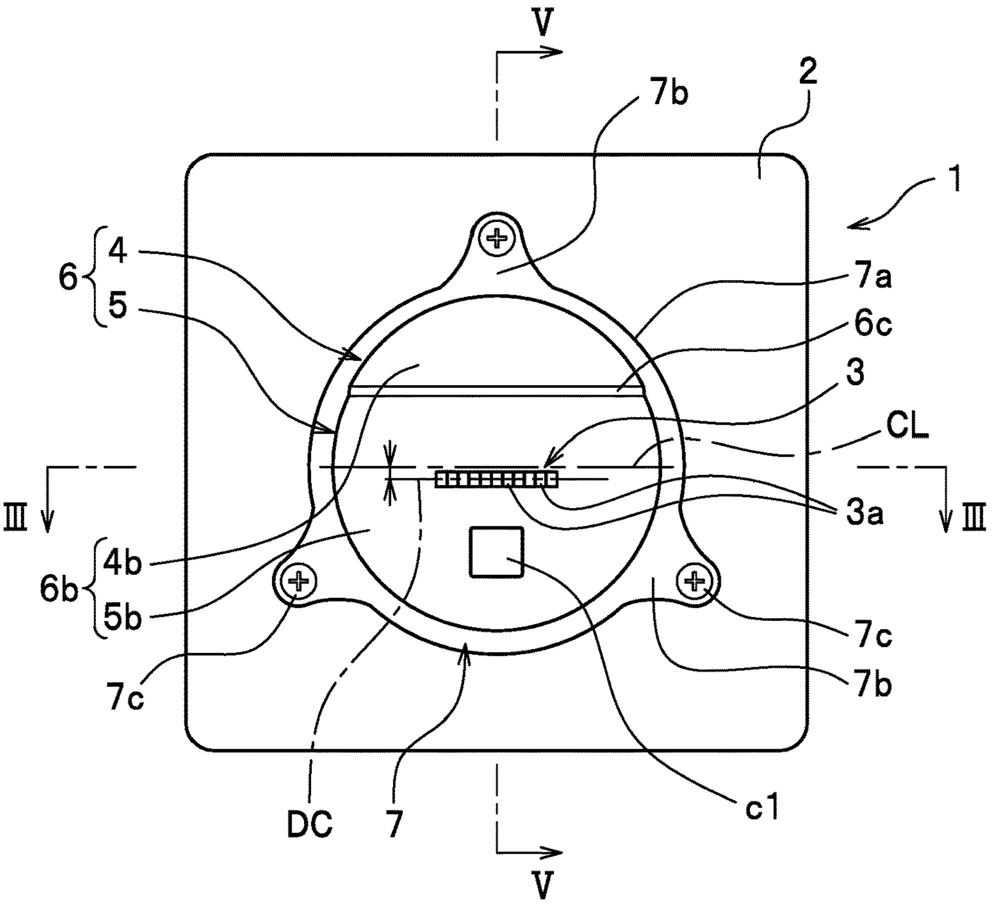
FIG. 2 is a schematic front view of the light-emitting module according to the present embodiment.

A plurality of light-emitting devices 3*a* are arranged at regular intervals in the horizontal and vertical directions and mounted on or above the mounting board 3*b* as shown in FIG. 1 and FIG. 2. For example, three to fifteen (eleven in FIGS. 1 and 2) of the light-emitting devices 3*a* are aligned in each row in the horizontal direction at regular intervals. Here, a center DC of the emitting surface of the row of light-emitting devices 3*a* is located below a lens convex vertex CL, which is the center of the second lens 5 of the projection lens 6, in the vertical direction. The light-emitting devices 3*a* are located below the lens convex vertex CL of the projection lens, such that the radiation direction of light emitted from the light-emitting devices 3*a* can be directed upward. The light-emitting devices 3*a* are disposed a predetermined distance away from the incident surface 6*a* of the projection lens 6, with the incident surface 6*a* facing all the light-emitting devices 3*a* arranged, such that light radiated from the light-emitting devices 3*a* can be incident on the incident surface 6*a* of the projection lens 6. An array of independent light-emitting devices 3*a* or a light-emitting device including a plurality of emitting surfaces aligned in a row may be used for the light-emitting devices 3*a*. The lens convex vertex here indicates the position of the most protruded portion of the convex in the case where the second lens 5 described later is formed into a substantially hemispherical shape. The central axis in the case where the first lens 4 is formed into a substantially hemispherical shape is indicated as a lens convex-portion vertex SL (see FIG. 4). The light-emitting devices 3*a* are described as the light-emitting area, which is the expanse of the surface that emits light in some cases, or as a point light source irradiating light in other cases.

Figure 6:
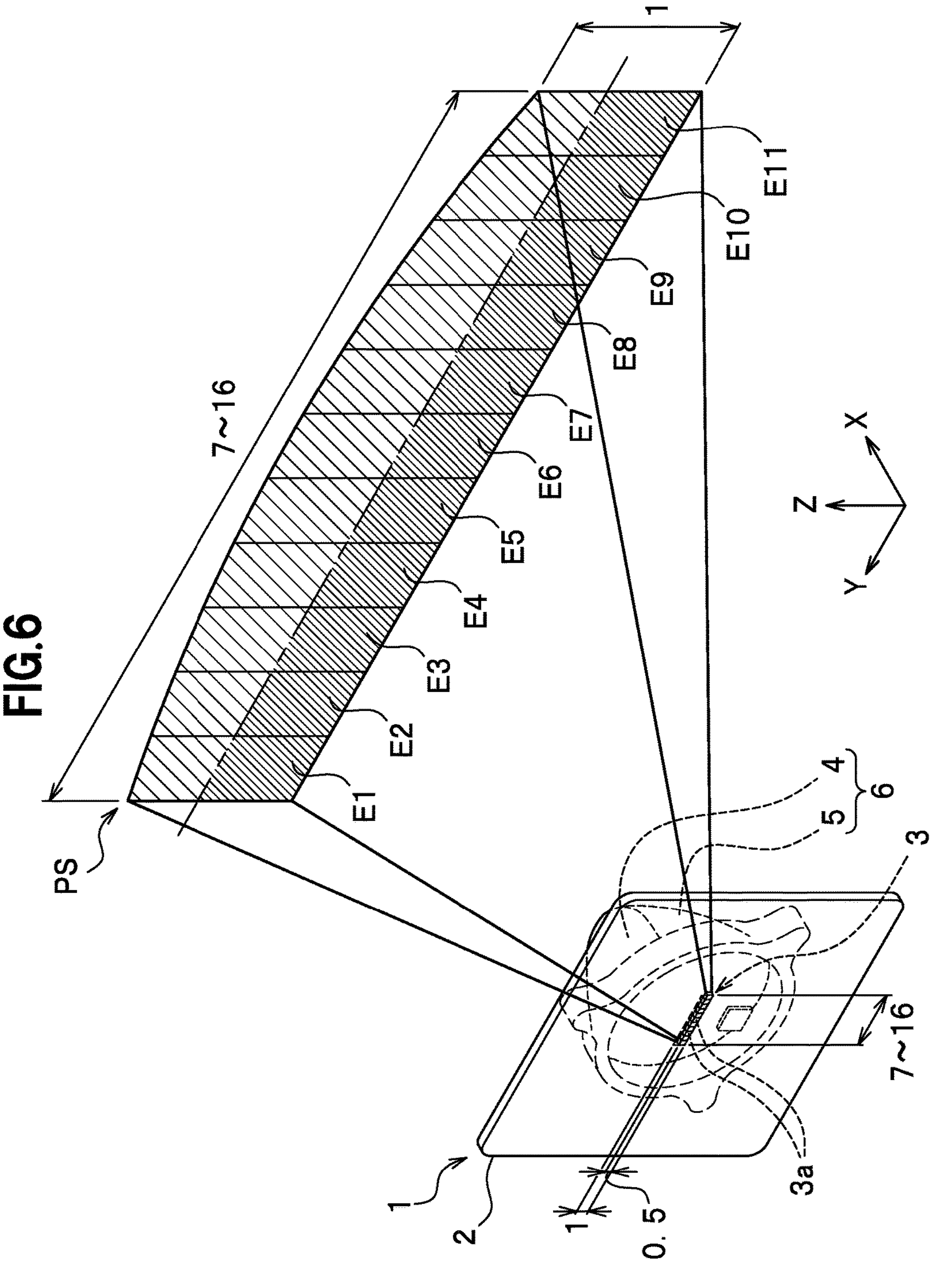
FIG. 6 is a diagram schematically showing the relation between the aspect ratio of the light-emitting area of the light-emitting elements in the light-emitting module according to the present embodiment and the aspect ratio of the projected area on the projection plane.

As shown in FIG. 6, the row of light-emitting devices 3*a* is formed into the light-emitting area having a value in the vertical direction of the horizontal-to-vertical ratio (i.e., aspect ratio) smaller than the value in the horizontal direction of the horizontal-to-vertical ratio for the projected area on a projection plane PS projected through the projection lens 6 described later. The horizontal-to-vertical ratio is the ratio between the length (i.e., distance or the angular range from the central axis of the lens) in the horizontal direction and the length (i.e., distance or the angular range from the central axis of the lens) in the vertical direction. The range of the light-emitting area of the light-emitting devices 3*a* is determined as follows in the case where, for example, the range of the projected area has a horizontal-to-vertical ratio for the projected area on the projection plane PS in the range of 7:1 to 16:1. In the case where the horizontal-to-vertical ratio for the range of the projected area is, for example, 7:1 to 16:1 as described above, the range of the light-emitting area has a value in the vertical direction smaller than 1. The range of the light-emitting area of the row of light-emitting devices 3*a* has a ratio between the range of 7:0.4 to 7:0.7 and the range of 16:0.4 to 16:0.7. In other words, regarding the horizontal value as being equivalent to the horizontal value of the horizontal-to-vertical ratio for the range of the projected area, the ratio of the vertical value to the vertical value for the projected area is preferably in the range of 0.4:1 to 0.7:1 (in the example in FIG. 6, the value in the vertical direction of the horizontal-to-vertical ratio is 0.5).

If the vertical value of the horizontal-to-vertical ratio for the light-emitting area of the row of light-emitting devices 3*a* is 0.7 or less assuming that the value in the vertical direction of the horizontal-to-vertical ratio for the range of the projected area is 1, the portion of the light-emitting area that cannot be efficiently used is reduced. If light with a constant intensity per unit area is radiated assuming that the vertical value of the horizontal-to-vertical ratio for the range of the projected area is 1, a vertical value of the horizontal-to-vertical ratio for the row of light-emitting devices 3*a* of less than 0.4 causes the light to fall required light intensity shortage. Accordingly, assuming that the value in the vertical direction for the range of the projected area is 1, the value in the vertical direction for the range of the light-emitting area of the light-emitting devices 3*a* is preferably in the range of 0.43 to 0.6, more preferably 0.45 to 0.55, even more preferably 0.47 to 0.53, most preferably 0.48 to 0.5. The light-emitting area of the light-emitting devices 3*a* is the area of the light-extracting surfaces of the light-emitting devices 3*a*. In the light-emitting module 1, reducing the light-emitting area or the number of the light-emitting elements of the light-emitting devices 3*a* allows the light-emitting devices 3*a* to efficiently operate to exhibit a light distribution in accordance with a standard.

A known package including light-emitting elements can be used for the light-emitting devices 3*a*. For example, light-emitting diodes or laser diodes are preferably used for the light-emitting elements.

A wavelength can be appropriately selected for the emission wavelength of the light-emitting elements used in the light-emitting devices 3*a*. Examples of blue or green light-emitting elements include light-emitting elements including a nitride semiconductor ($In_XAl_YGa_{1-X-Y}N$, where $0 \leq X$, $0 \leq Y$, $X+Y \leq 1$) or GaP. For red light-emitting elements, GaAlAs, AlInGaP, or the like can be used other than nitride semiconductor elements. Semiconductor light-emitting elements made of a material other than the above materials can also be used for the light-emitting devices 3*a*. Light emitted from the light-emitting devices 3*a* only needs to be white light when being emitted from the light source unit 3 toward the projection lens 6. Thus the light-emitting device 3*a* is configured to include at least one phosphor contained in a light-transmissive resin member, such as an encapsulating member, disposed on the optical path in order to enable radiation of white light.

The composition, emission color, size, and number of the light-emitting elements in the light-emitting devices 3*a* can be appropriately selected depending on the purpose. Preferably, the light-emitting elements each have a pair of positive and negative electrodes preferably on the same surface. This structure enables the light-emitting element to be flip-chip mounted. In this case, the surface opposite to the surface on which the pair of electrodes are formed serves as the main light-extracting surface of the light-emitting element. In the case where the light-emitting element is face-up mounted, the surface on which the pair of electrodes are formed serves as the main light-extracting surface of the light-emitting device 3*a*. The light-emitting device 3*a* is electrically connected to the mounting board 3*b* with bonding members, such as bumps, therebetween. The method for mounting the light-emitting device 3*a* is not limited. For example, the light-emitting device 3*a* is electrically connected to and mounted on or above the wiring portion of the mounting board 3*b* via terminals.

The mounting board 3*b* on or above which the light-emitting devices 3*a* are mounted is mounted on the support substrate 2. The mounting board 3*b* includes an insulating base material and wiring disposed on the base material. Mounting boards 3*b* on or above which the light-emitting devices 3*a* are respectively mounted may be mounted and arranged on the support substrate 2, or the mounting board 3*b* on or above which a plurality of light-emitting devices 3*a* are mounted may be disposed on the support substrate 2. The base material of the mounting board 3*b* is not particularly limited as long as the light-emitting devices 3*a* are mounted. For example, the base material has a plate shape.

Support Substrate

The support substrate 2 is a member on which the mounting board 3*a* provided with the light-emitting device 3*a* is mounted. The support substrate 2 supports the frame body 7. The support substrate 2 has a larger area than the area of the projection lens 6 or the frame body 7, and the light source unit 3 is disposed at the substantial center of the support substrate 2. For example, the support substrate 2 is formed into a rectangular planar shape. The support substrate 2 includes the base material and the wiring disposed on the base material. On the wiring of the support substrate, the mounting board 3*b*, a control IC chip c1, or a component such as an external-connecting terminal, for electrical connection are disposed. Making the support substrate 2 larger than the projection lens 6 or the frame body 7 facilitates dissipation of heat generated by lighting of the light source unit 3. The size of the support substrate 2 is preferably 1.5 times or more the incident surface 6*a* of the projection lens in area. The upper limit of the size of the support substrate 2 is limited in relation to the space in which the support substrate 2 is installed, and the size is preferably, for example, four times or less the incident surface 6*a* in area when applied as a vehicle lamp 100 described later.

An insulating material that hardly transmits light emitted from the light-emitting devices 3*a* and extraneous light is preferably used for the base material of the support substrate 2. A somewhat strong material is preferably used for the base material. Specific examples of the material include: ceramics, such as alumina, aluminum nitride, and mullite; and resins, such as phenolic resins, epoxy resins, polyimide resins, bismaleimide-triazine resins (BT resins), and polyphthalamide (PPA).

The wiring of the support substrate 2 can be made of, for example, a metal such as Cu, Ag, Au, Al, Pt, Ti, W, Pd, Fe, and Ni or an alloy of these metals. The wiring can be formed by electroplating, electroless plating, vapor deposition, sputtering, or the like.

A terminal for electrical connection to the outside is formed on the support substrate 2, and a mounting member such as a supporting leg is also disposed depending on where to use. The support substrate 2 also has mounting holes at the four corners so that the heat sink 8 for heat dissipation can be disposed on the back surface, which is the surface opposite to the light source unit 3.

Projection Lens

The projection lens 6 projects light emitted from the light source unit 3 in the radiation direction as shown in FIG. 3 and FIG. 4. The projection lens 6 projects light emitted from the light source unit 3 to form a predetermined light distribution on an imaginary vertical screen (i.e., projection plane PS) in the front direction of the radiation direction. The projection lens 6 includes the first lens 4 and the second lens 5 that are planoconvex lenses having the same curvature and equivalent focal lengths disposed adjacently to each other in the vertical direction (i.e., Z direction) or as an integrated body (i.e., the drawings illustrate an example of an integrated body). The projection lens 6 includes the first lens 4 and the second lens 5 both having incident surfaces 4*a* and 5*a*, and light exiting surfaces 4*b* and 5*b*. The incident surface 4*a* of the first lens 4 and the incident surface 5*a* of the second lens 5 are in the same plane without a divider. A light exiting surface 4*b* of the first lens 4 is at a position shifted in parallel from a light exiting surface 5*b* of the second lens 5 upward in the vertical direction (i.e., Z direction) with a step 6*c* constituting a divider therebetween, so that the angles of the optical axes in the vertical direction differ from each other.

In other words, the light exiting surface 4*b* of the first lens 4 is at a position shifted from the light exiting surface 5*b* of the second lens 5 in the vertical direction, thus the angle of the optical axis of the second lens 5 is smaller than the angle of the optical axis of the first lens 4 in the vertical direction. For example, in the projection lens 6, the angle of the optical axis of the first lens 4 in the vertical direction is 3.5° to 4°, and the angle of the optical axis of the second lens 5 in the vertical direction is 0.5° to 1°. The angles of the optical axes of the first lens 4 and the second lens 5 differ from each other in the vertical direction. The projection lens 6 can be in accordance with a standard and form a predetermined light distribution pattern. The projection lens 6 includes the first lens 4 and the second lens 5 having the same curvature and equivalent focal lengths, and the angles of the optical axes of the first lens 4 and the second lens 5 are adjusted by making the light exiting surface 4*b* of the first lens 4 and the light exiting surface a of the second lens 5 different from each other by shifting in the vertical direction, so that adjustment to a desired light distribution or light distribution pattern is achieved. The step 6*c* that divides the first lens 4 and the second lens 5 forms an acute angle, but the step 6*c* may be formed such that the light exiting surface 4*b* of the first lens 4 is smoothly connected to the light exiting surface 5*b* of the second lens 5.

In the projection lens 6, the division ratio in the vertical direction between the first lens 4 at the upper position in the vertical direction and the second lens 5 at the lower position in the vertical direction is determined such that the second lens 5 is larger than the first lens 4. The division ratio in the vertical direction between the first lens 4 and the second lens 5 is, for example, in the range of 1:5 to 3:5 (1:3 in the drawings). If the value of the division ratio is smaller than 1:5, in other words, the ratio of one lens to the other lens is too low, a light distribution pattern that complies with a standard cannot be obtained. In addition, if the difference of the division ratio in the vertical direction between the first lens 4 and the second lens 5 is smaller than 3:5, in other words, if the ratio of the lenses are too close to each other, a light distribution pattern that complies with a standard cannot be obtained. The positional relation between the first and second lenses 4 and 5 and the light-emitting devices 3*a* is such that the emitting surface of the light-emitting devices 3*a* is located on the central axes CL and SL of the substantially hemispherical first and second lenses 4 and 5, with the luminescence center DC of the light-emitting devices 3*a* being deviated from the central axes CL and SL of the lenses. In other words, the division ratio between the first lens 4 and the second lens 5 is such that the ratio of the first lens 4 is in the range of about 17% to 40% out of the whole 100%. That is, the ratio of the surface area of the light exiting surface 4*b* of the first lens 4 is about 17% to 40% of the light exiting surface 6*b* of the projection lens 6, which is regarded as 100%.

The projection lens 6 includes the first lens 4 and the second lens 5 having equivalent focal lengths and the same curvature formed adjacently to each other or as an integrated body. Thus, the structure is simple, and the manufacture is easy. For example, in the case of an application as the vehicle lamp 100, the number of optical components can be very small, and adjustment at the time of installment can be easily performed. Light that has entered the projection lens 6 through the incident surface 6*a* exits through the light exiting surface 6*b* in two different optical axis directions and is radiated to the projection plane PS to form a desired light distribution pattern and light distribution.

Frame Body

The frame body 7 holds the projection lens 6 and the light-emitting devices 3*a* of the light source unit 3 at predetermined positions as shown in FIG. 1 and FIG. 3. The frame body 7 includes, as an integrated body in this case, a lens supporting unit 7*a* supporting the projection lens 6 and connecting units 7*b* that are disposed on the periphery of the lens supporting unit 7*a* and are used for connection in order to the support substrate 2.

The lens supporting unit 7*a* includes a body supporting unit 7*a*1 having a ring shape and a support ring 7*a*2. The body supporting unit 7*a*1 has contact with the periphery of the incident surface 6*a* and the peripheral surface of the lens continuous with the incident surface 6*a* of the projection lens 6 to support the projection lens 6. The support ring 7*a*2 faces the body supporting unit 7*a*1 and has contact with the peripheral surface of the projection lens 6 to allow the body supporting unit 7*a*1 to support the projection lens 6. The lens supporting unit 7*a* has such a height that the incident surface 6*a* of the projection lens 6 is disposed at a position a predetermined distance with respect to the surface of the support substrate 2. The support ring 7*a*2 has an inside diameter of the ring smaller than the maximum outline of the projection lens 6 to support the projection lens 6.

Accordingly, to support the projection lens 6 at a predetermined position, the supporting ring 7*a*2 is disposed to face the lens supporting unit 7*a* with the projection lens 6 disposed on the body supporting unit 7*a*, and performing fixing with attaching screws 7*c* described later. The structure of the lens supporting unit 7*a* is not particularly limited as long as the structure is the above kind of structure.

The connecting units 7*b* and the lens supporting unit 7*a* are formed as an integrated body, and the connecting units 7*b* each have a threaded hole into which the attaching screw 7*c* is screwed. Three connecting units 7*b* are formed on the periphery of the lens supporting unit 7*a* so as to protrude on the extension of the diameter.

Figure 7:
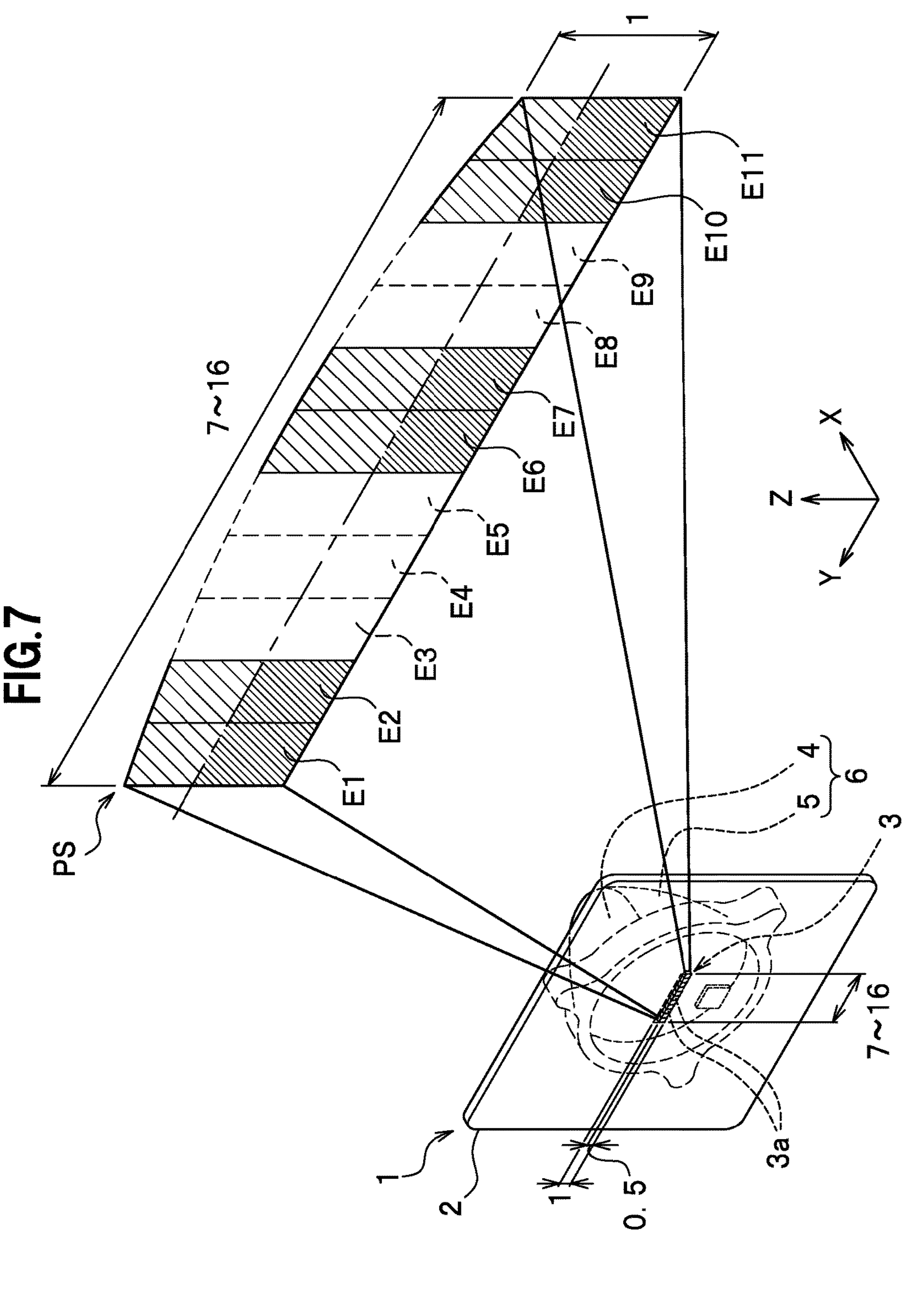
FIG. 7 is a diagram schematically showing the relation between the aspect ratio of the light-emitting area of the light-emitting elements in the light-emitting module according to the present embodiment and the aspect ratio of the projected area on the projection plane, and showing the lit and unlit states of the light-emitting elements.

As shown in FIG. 6 and FIG. 7, the light-emitting module 1 having the above structure can radiate light showing a desired light distribution or light distribution pattern on the projection plane PS, and can achieve a high contrast between light and dark when the light radiated to the projection plane PS is partially extinguished.

In the case where, for example, the light-emitting module 1 includes eleven light-emitting devices 3*a* as shown in FIG. 6, in the state in which all the light-emitting devices 3*a* are lit, a projected area including continuous regions E1 to E11 of light respectively radiated from the light-emitting devices 3*a* is formed on the projection plane PS. In FIG. 6 and FIG. 7, in each of the regions E1 to E11 on the projection plane PS, the state in which the region below the center in the vertical direction is brighter than the region above the center is illustrated using the density of hatching. A higher density of hatching means brighter.

Figure 5:
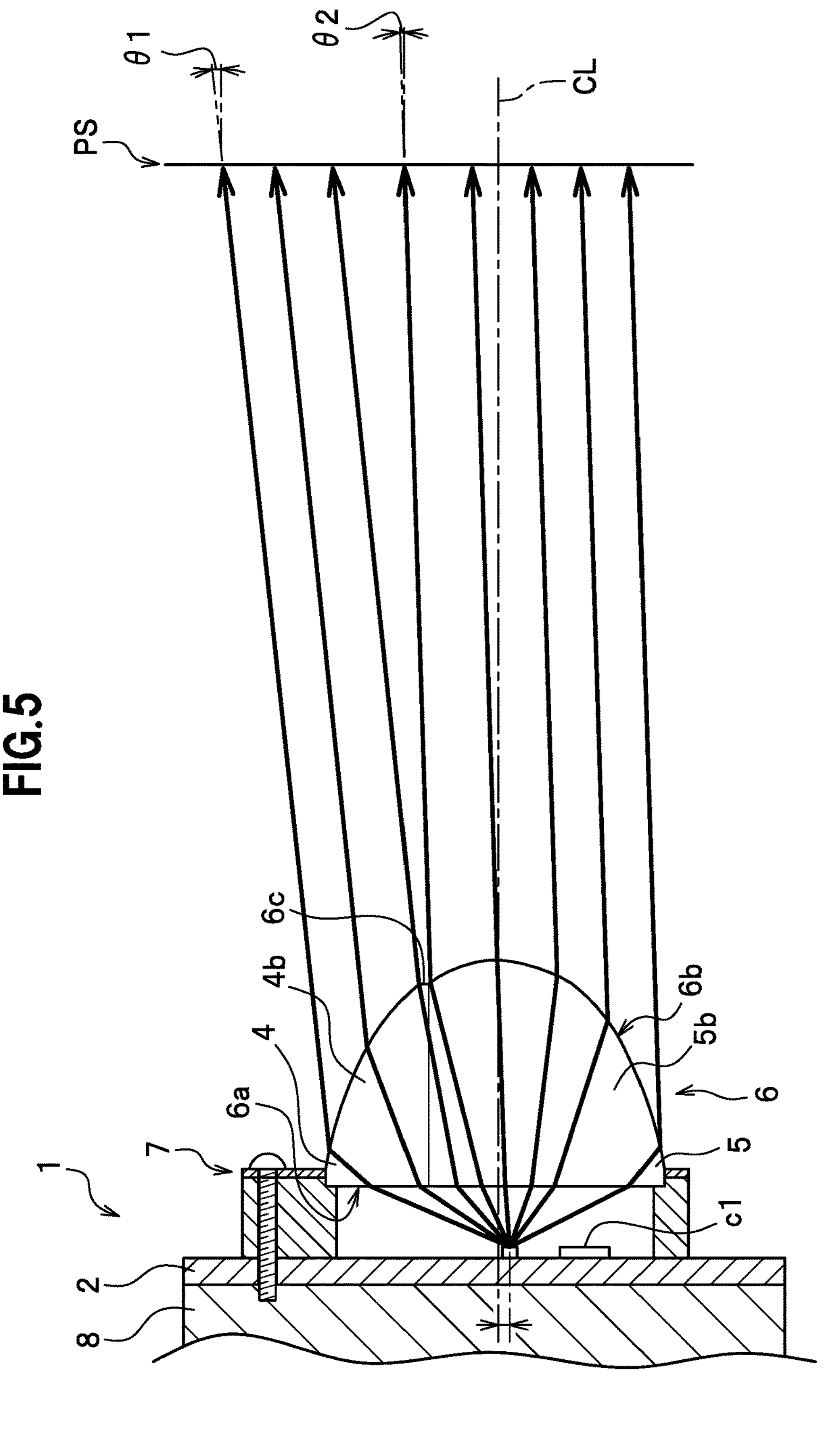
FIG. 5 is a partially omitted schematic sectional view taken along the line V-V in FIG. 2 and showing the directions of light emitted from light-emitting elements.

In the case where light radiated from the light-emitting module 1 forms a projected area having a horizontal-to-vertical ratio of, for example, 7:1 on the projection plane PS, the light-emitting area of the light-emitting devices 3*a* has a ratio of, for example, 7:0.5. Light is radiated to the projection plane PS through the projection lens 6 including the first lens 4 and the second lens 5 having different optical axes as shown in FIG. 5, such that a light distribution on the projection plane PS is kept in accordance with a standard. In this light-emitting module 1, the optical axes of the first lens 4 and the second lens 5 differ from each other by 2.5° to 3.5°, so that a light distribution that complies with a standard can be obtained on the projection plane PS.

The first lens 4 and the second lens 5 combined to constitute the projection lens 6 are required to have the same projection magnification in the light-emitting module 1, such that the lenses have the same focal length. The angles of the optical axes of the first lens 4 and the second lens 5 are different from each other so that images of the projection light source formed by light emitted through the lenses do not overlap each other on the projection plane PS. In other words, if light beams exiting from the first lens 4 and the second lens 5 overlap each other on the projection plane PS, the overlapped region has the highest illuminance, which hinders conformity to a standard in the case of, for example, an application as the vehicle lamp 100. Hence, the angle (i.e., θ1 in FIG. 5) of the optical axis of the first lens 4 is in the range of, for example, +2 to +6, preferably +2 to +5, from the horizon. The angle (i.e., θ2 in FIG. 5) of the optical axis of the second lens 5 is in the range of −2 to +2, preferably −1 to +2. The angles of the optical axes of the first lens 4 and the second lens 5 are not the same.

Accordingly, the light-emitting module 1 can form a radiated region of light on the projection plane PS so as to be in accordance with a specified light distribution standard.

The on and off states of each of the regions E1 to E11 of the light-emitting module 1 can be controlled as shown in FIG. 7 using control manners for controlling the light source unit 3. In the illustrated example, the light-emitting devices 3*a* of the light source unit 3 are controlled such that the regions E3, E4, E5, E8, and E9 are not lit and that the other regions E1, E2, E6, E7, E10, and E11 are lit. The light-emitting module 1 includes the first lens 4 and the second lens 5 having equivalent focal lengths and the same curvature, such that in the case where, for example, the regions E3, E4, E5, E8, and E9 are not lit, high contrast between darkness of the aforementioned unlit regions and brightness of the lit regions of E2, E6, E7, and E10 is achieved.

The light-emitting module 1 described above can be used as, for example, the vehicle lamp 100. In the case where the light-emitting module 1 is used as the vehicle lamp 100, the heat sink 8 formed using metal is disposed on the back surface of the support substrate 2.

The heat sink 8 is, for example, detachably disposed on the support substrate 2 with screws using the mounting holes formed at the four corners of the support substrate 2. The heat sink 8 is formed using a metal having a high thermal conductivity, such as an aluminum alloy, and includes a plurality of small pillars so that its surface area is increased. In the case where the light-emitting module 1 is used as the vehicle lamp 100, members required when the vehicle lamp 100 is installed in a vehicle, for example, a mounting member and a reflecting mirror, are used together.

Figure 8:
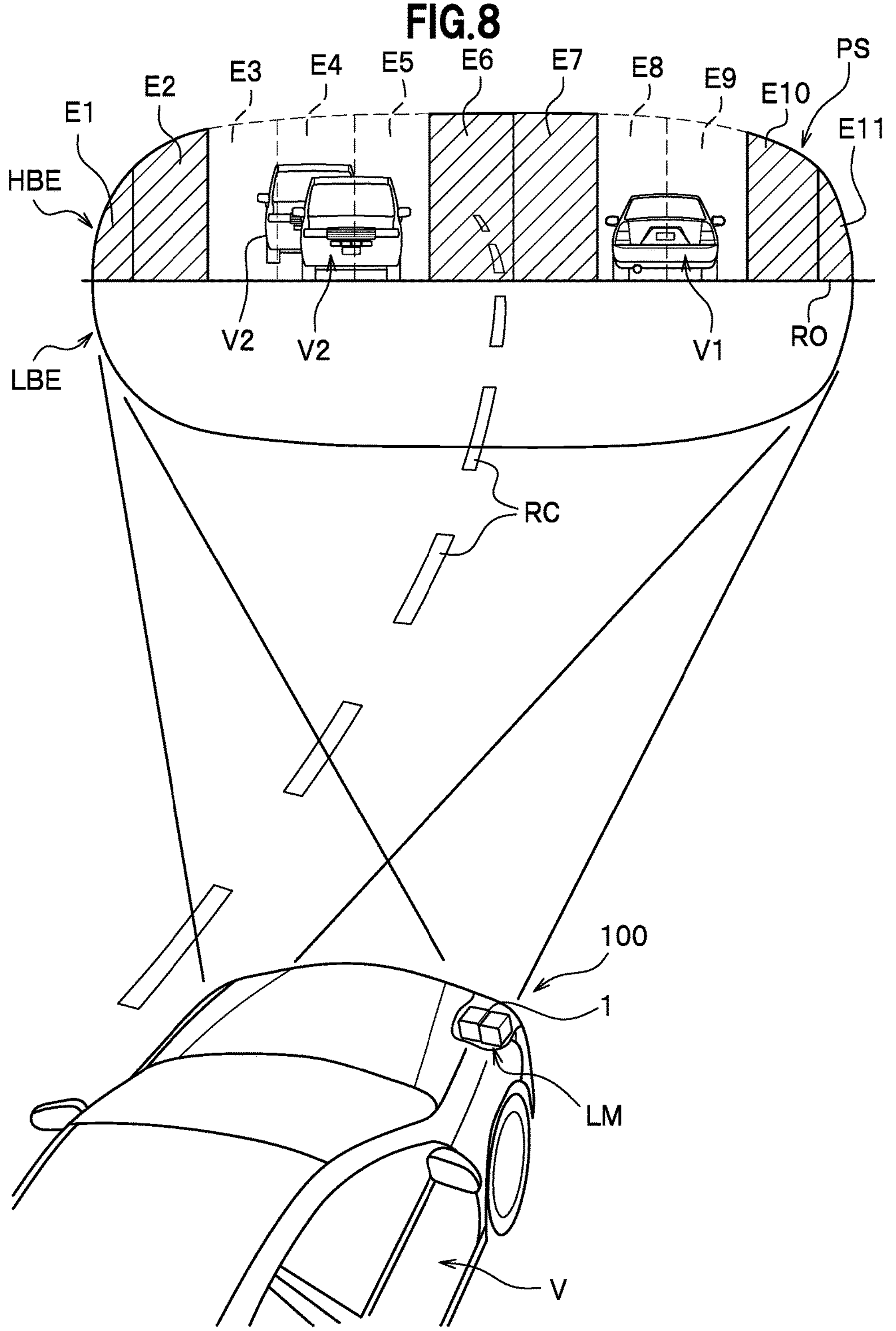
FIG. 8 is a diagram schematically showing the state in which the light-emitting module according to the present embodiment is installed in a vehicle as a vehicle lamp, and showing the state of radiation of light from the vehicle lamp.

For example, in the case where the light-emitting module 1 is used as a high-beam module that is the vehicle lamp 100, such as a headlight for a vehicle V, as shown in FIG. 8, a separate low-beam module LM is used together. In the case of the vehicle lamp 100, schematically on the projection plane PS, a low-beam area LBE that is a predetermined range of a road surface RO is irradiated with light radiated from the low-beam module LM, and a high-beam area HBE that is a predetermined space region above the road surface is irradiated with light radiated from the light-emitting module 1.

Vehicle lamps 100 are disposed as headlights at the right and left of the front portion of the vehicle V, and both of the right and left vehicle lamps 100 radiate light to the same range of the projection plane PS such that the light beams overlap each other. Signals from a sensor mounted in the vehicle V control the light source unit 3 of the light-emitting module 1 of each of the vehicle lamps 100 to turn the light-emitting devices 3*a* on or off. As shown in FIG. 8, if the sensor detects a plurality of oncoming vehicles V2 on a center line RC of the roadway and a vehicle V1 in the same lane as the vehicle V, the sensor sends a signal to the light-emitting module 1 to turn off the light-emitting devices 3*a* that radiate light to the regions E3 to E5 corresponding to the oncoming vehicles V2 on the projection plane PS and the regions E8 and E9 corresponding to the vehicle V1 on the projection plane PS. While the on and off states of the light-emitting module 1 are controlled, the low-beam module LM constantly radiates light to illuminate the road surface RO.

Accordingly, high beams radiated from the vehicle lamp 100 are unlikely to dazzle the drivers of the oncoming vehicles V2 and the vehicle V1 because of glaring light or glare.

The low-beam area LBE and the high-beam area HBE include not only regions on the same plane but also different space regions, and FIG. 8 schematically illustrates the space to which light is radiated. The regions irradiated with light on the projection plane PS are, for example, the regions E1, E2, E6, E7, E10, and E11, and the hatching indicates the irradiated regions. The portion irradiated with light is enclosed by a border line in FIG. 6, FIG. 7, and FIG. 10, but actually the border line of light does not exist. Also, the projection plane PS is an imaginary vertical plane, and no concrete plane on which light is projected actually exists.

As described above, in the case where the light-emitting module 1 is used as the vehicle lamp 100, a region required to be illuminated for a driver to drives a vehicle is brightly illuminated, and irradiation of a region in which irradiation with light adversely affect, such as regions including the oncoming vehicles V2 and the vehicle V1, is suppressed.

Figure 9A:
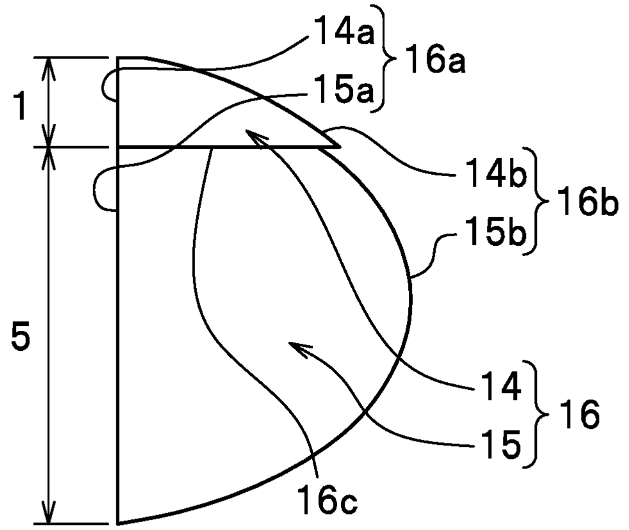
FIG. 9A is a schematic lateral view of a modification of the projection lens of the light-emitting module according to the present embodiment.
Figure 9B:
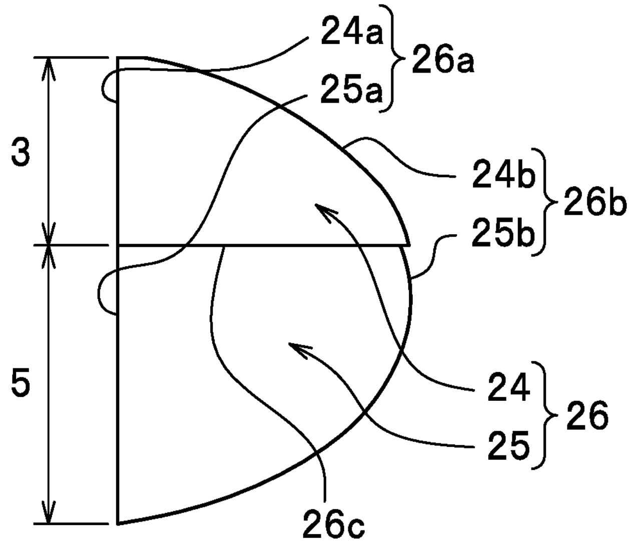
FIG. 9B is a schematic lateral view of another modification of the projection lens of the light-emitting module according to the present embodiment.

The division ratio in the vertical direction between the first lens 4 and the second lens 5 of the projection lens 6 has been described as being 1:3 as shown in FIG. 4 for the light-emitting module 1 or the vehicle lamp 100, but the ratio may be in the range of 1:5 to 3:5 as shown in FIG. 9A and FIG. 9B. A projection lens 16 includes a first lens 14 and a second lens 15 at a division ratio in the vertical direction of 1:5, and an incident surface 14*a* of the first lens 14 and an incident surface 15*a* of the second lens 15 constitute an incident surface 16*a* of the projection lens 16 in the same plane as shown in FIG. 9A. A light exiting surface 14*b* of the first lens 14 is translated in the vertical direction from a light exiting surface 15*b* of the second lens 15 to form a step 16*c* serving as a divider, so that light is radiated to the projection plane through a light exiting surface 16*b* of the projection lens 16 along optical axes that differ from each other in the vertical direction.

A projection lens 26 includes a first lens 24 and a second lens 25 at a division ratio in the vertical direction of 3:5, and an incident surface 24*a* of the first lens 24 and an incident surface 25*a* of the second lens 25 constitute an incident surface 26*a* of the projection lens 26 in the same plane as shown in FIG. 9B. A light exiting surface 24*b* of the first lens 24 is translated in the vertical direction from a light exiting surface 25*b* of the second lens 25 to form a step 26*c* serving as a divider, so that light is radiated to the projection plane through a light exiting surface 26*b* of the projection lens 26 along optical axes that differ from each other in the vertical direction.

Figure 9C:
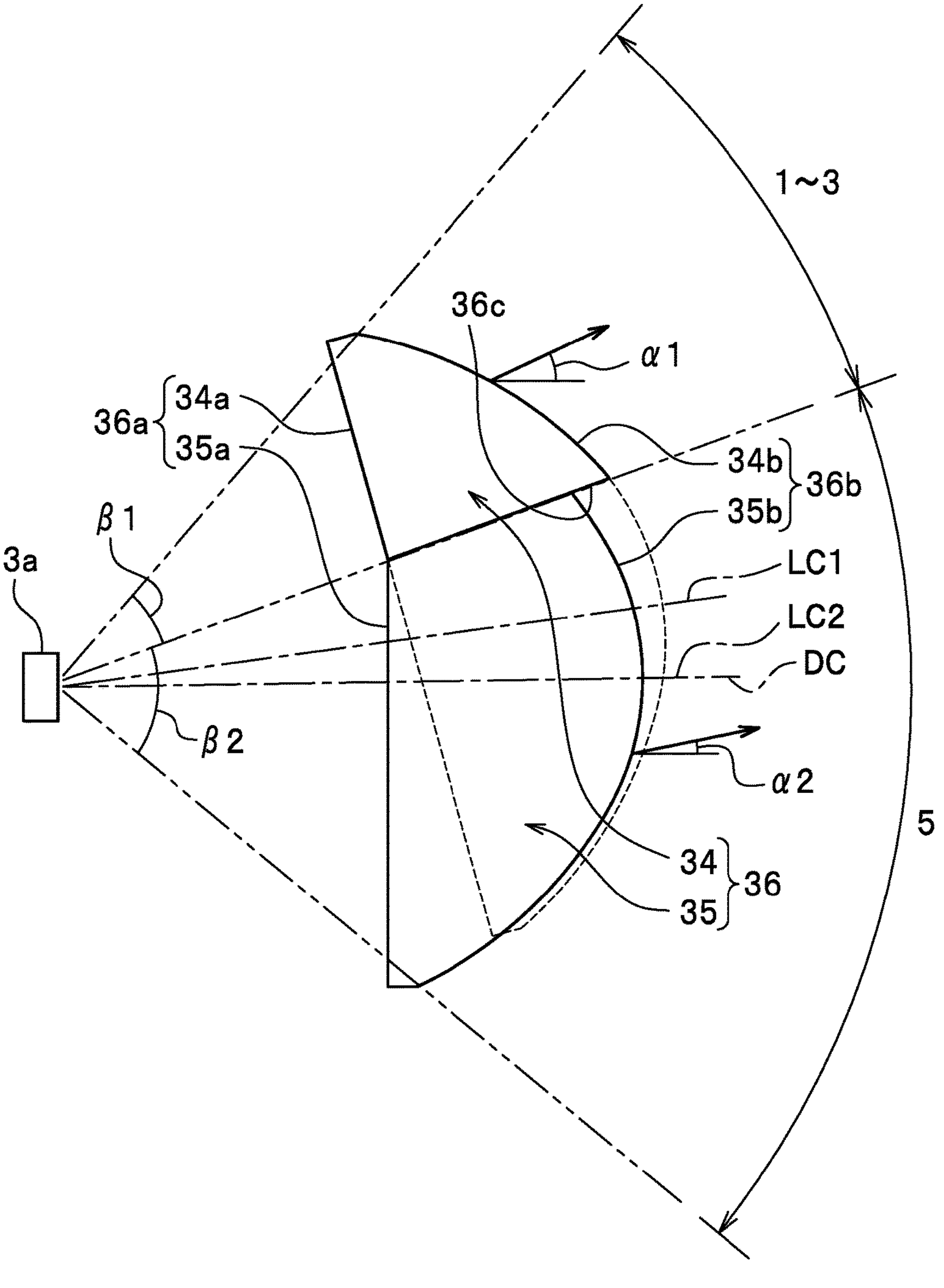
FIG. 9C is a schematic lateral view of still another modification of the projection lens of the light-emitting module according to the present embodiment.

In addition, a projection lens 36 includes a first lens 34 and a second lens 35 such that the center of the emission surface of the light source unit 3 lies on central axes LC1 and LC2 of the lenses as shown in FIG. 9C. The first lens 34 and the second lens 35 are formed in different rotation angle ranges with respect to a central axis DC of the light emitting area center of the light source unit 3. A light exiting surface 35*b* of the second lens 35 disposed at the lower position in the vertical direction is formed in a larger rotation angle range than the range of a light exiting surface 34*b* of the first lens 34. In other words, the division ratio for the light exiting surface as a whole may be such that the ratio of the second lens 35 is larger than the ratio of the first lens 34 in the angular range in the rotational direction. In the projection lens 36, an incident surface 36*a* is a continuous surface including continuous planes having different angles, and a light exiting surface 36*b* includes curved surfaces having the same curvature and different optical axes. In other words, the projection lens 36 is formed as an integrated lens including a step 36*c* as a divider between the first lens 34 and the second lens 35. The projection lens 36 has the continuous incident surface 36*a* including continuous planes of an incident surface 34*a* of the first lens 34 and an incident surface 35*a* of the second lens 35 having different angles.

In the light exiting surface 36*b* of the projection lens 36 having the constant curvature, an optical axis α1 of the first lens 34 and an optical axis α2 of the second lens 35 have different angles in the vertical direction. In other words, the light exiting surface 34*b* of the first lens 34 is determined by a rotation angle range β1 with respect to the central axis DC of the center of the emission surface, and the rotation angle range β1 is smaller than a rotation angle range β2 in which the light exiting surface 35*b* of the second lens 35 is determined. Accordingly, the ratio of the light exiting surface 35*b* of the second lens 35 is larger than the ratio of the light exiting surface 34 of the first lens 34.

In the projection lens 36, the ratio between the light exiting surface 34*b* of the first lens 34 and the light exiting surface 35*b* of the second lens 35 is in the range of 1:5 to 3:5 within rotation angle ranges. If the difference of the ratio of rotation angle ranges is greater than 1:5, in other words, the ratio of the light exiting surface 34*b* of the first lens is small compared with the ratio of the light exiting surface 35*b* of the second lens 35, a light distribution pattern in accordance with a standard cannot be obtained. Also, if the difference of the ratio of the rotation angle ranges is smaller than 3:5, in other words, the ratio of the light exiting surface 34*b* of the first lens is too close to the ratio of the light exiting surface 35*b* of the second lens 35, a light distribution pattern in accordance with a standard cannot be obtained. In FIG. 9C, a central axis CL2 of the second lens 35 overlaps the central axis DC of the center of the emission surface on the same line. The central axis LC1 of the first lens 34 and the central axis LC2 of the second lens 35 are central axes in the case where the lenses are formed into substantially hemispherical shapes. In addition, the determined angles of the angles of the optical axis α1 of the first lens 34 and the optical axis α2 of the second lens, and the difference therebetween are the same as in the projection lens 6 shown in FIG. 4.

The ratios of the light exiting surface 34*b* of the first lens 34 and the light exiting surface 35*b* of the second lens 35 are determined by the ratio of the light exiting surface 34*b* within a predetermined rotation angle range with respect to the central axis DC. In other words, in the case where the whole light exiting surface 36*b* is regarded as 100%, the ratio of the light exiting surface 34*b* of the first lens 4 is in the range of about 17% to 40%. The first lens 34 is formed such that the ratio of the light exiting surface 34*b* is in the same range as for the ratio of the above light exiting surface 4*b*.

The light-emitting module 1 or vehicle lamp 100 described above may have the following structure.

Figure 10:
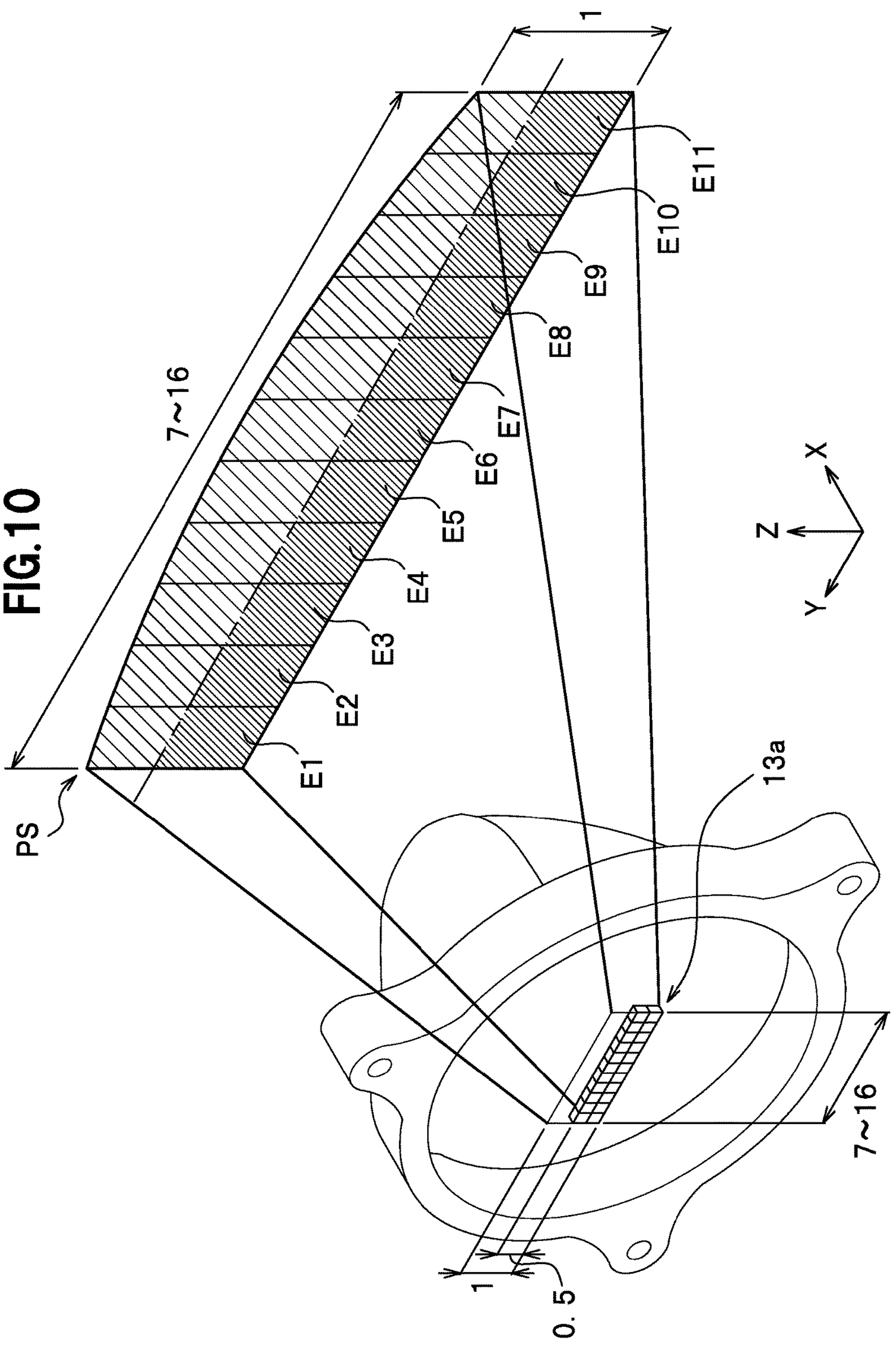
FIG. 10 is a diagram schematically showing a modification of the light-emitting elements in the light-emitting unit of the light-emitting module according to the present embodiment, and showing the relation between the light-emitting area of the light-emitting elements and the projected area on the projection plane, with a support substrate being omitted.

That is, a package in which the light-emitting devices 3*a* are mounted in a recess of a resin mold may be used in the light source unit 3. The light-emitting devices 3*a* of the light source unit 3 have been described as being aligned in a row but may be aligned in a plurality of rows as shown in FIG. 10. In the case where the horizontal-to-vertical ratio for the projected area on the projection plane PS is 7:1 to 16:1, the horizontal-to-vertical ratio for the light-emitting area of light-emitting devices 13*a* is 7:0.5 to 7:0.4, to 14:0.5 to 14:0.5. In other words, the light-emitting devices 13*a* are aligned in a plurality of rows (two rows in the drawing) at regular intervals in the horizontal and vertical directions in an area that has the same horizontal value as the horizontal value of the ratio for the projected area and has a vertical value of 0.5 to 0.4, which is equal to or less than a half of the vertical value, 1, of the ratio. In the case where a plurality of rows are formed, light-emitting devices 13*a* in the same column are turned on or off at the same time. FIG. 10 schematically shows the light-emitting devices 13*a* and the projection plane PS, and illustration of the support substrate and the like is omitted.

The light-emitting devices 3*a* may be respectively provided with light-transmissive encapsulating resin members, or an encapsulating resin member may integrally cover a plurality of light-emitting devices 3*a*. In the case where one or more encapsulating resin members are disposed, the encapsulating resin members may contain a phosphor. The phosphor can be appropriately selected from phosphors used in the field of the present disclosure. To provide a light-emitting module that can radiate white light, the emission color of the light-emitting devices 3*a* or 13*a* and the type and concentration of the phosphor contained in the encapsulating resin members are adjusted so that white light is obtained.

Although the projection lens 6 has been described as an integrated body of the first lens 4 and the second lens 5, the first lens 4 and the second lens 5 may be separately formed and bonded together with an adhesive or the like. The adhesive used in the case where the first lens 4 and the second lens 5 are bonded together is preferably a light-transmissive material that can guide light emitted from the light-emitting devices 3*a* to the first lens 4 and the second lens 5 without greatly refracting the light. The adhesive material is preferably, for example, a material having a refractive index equal to or close to the refractive index of the material for the first lens 4 and the second lens 5. Examples of the adhesive include known adhesive materials such as epoxy resins and silicone resins, organic adhesive materials with high refractive indices, inorganic adhesive materials, and adhesive materials employing low-melting-point glass. The projection lenses 16 and 26 may be formed by bonding with an adhesive in the same manner.

The example in which the light-emitting module 1 is mounted in an automobile as the vehicle lamp 100 has been described, but the light-emitting module 1 may be mounted in a motorbike, a motorboat, an airplane such as a Cessna, a projector, or other machines. In the case of a motorbike, the light-emitting module 1 is disposed at the center of the front portion of the body frame together with the low-beam module LM, not as in the case where an automobile in which a pair of light-emitting modules 1 are disposed at the right and left.

A protective element such as a Zener diode may be mounted on or above the mounting board 3*b*. The number of the light-emitting devices 3*a* is not particularly limited. Also, a lens smaller in area than the mounting board 3*b* may be included on the light-extracting surface of the light-emitting devices 3*a* or 13*a* such that the lens faces the light-emitting devices 3*a* or 13*a*.

What is claimed is:

1. A light-emitting module comprising:

a light source unit comprising a plurality of light-emitting elements aligned in a horizontal direction;

a projection lens receiving light emitted from the light source unit, and projecting the light through a light exiting surface of the projection lens in a radiation direction; and a frame body holding the light source unit and the projection lens at predetermined positions, wherein the projection lens comprises a first lens and a second lens each having a focal length equivalent to each other and a curvature equivalent to each other, the first lens and the second lens being disposed adjacently to each other in a vertical direction or as an integrated body, the first lens having a first light exiting surface with a first surface area and being at an upper position in the vertical direction, the second lens having a second light exiting surface with a second surface area and being at a lower position in the vertical direction, wherein a ratio of the second surface area to a surface area of the projection lens is larger than a ratio of the first surface area to the surface area of the projection lens, wherein an angle of an optical axis of the first lens differs from an angle of an optical axis of the second lens in the vertical direction of projection, and wherein a value in the vertical direction of a horizontal-to-vertical ratio for a light-emitting area of the light-emitting elements is smaller than a value in the vertical direction of a horizontal-to-vertical ratio for a projected area projected from the projection lens.

2. The light-emitting module according to claim 1, wherein the first lens and the second lens each comprise a plano-convex lens.

3. The light-emitting module according to claim 1, wherein the value in the vertical direction of the horizontal-to-vertical ratio for the light-emitting area of the light-emitting elements is equal to or less than half of the value in the vertical direction of the horizontal-to-vertical ratio for the projected area.

4. The light-emitting module according to claim 1, wherein a division ratio in the vertical direction between the first light exiting surface of the first lens and the second light exiting surface of the second lens is in a range of from 1:5 to 3:5.

5. The light-emitting module according to claim 1, wherein the first light exiting surface of the first lens and the second light exiting surface of the second lens have the same curvature to each other, and the first lens and the second lens constitute an integrated lens including:

an incident surface on a same plane without a divider; and a divider formed between the first light exiting surface of the first lens and the second light exiting surface of the second lens by shifting the first lens upward in a vertical direction such that the optical axes of the respective lenses are different from each other in angle in the vertical direction.

6. The light-emitting module according to claim 1, wherein a center of an emission surface of the light source unit lies on a central axis of the first lens and a central axis of the second lens, wherein the first lens and the second lens are formed in different rotation angle ranges with respect to a central axis of the center of the emission surface of the light source unit, and wherein the rotation angle range in which the second lens is formed is larger than the rotation angle range in which the first lens is formed to make the ratio of the second light exiting surface of the second lens larger.

7. The light-emitting module according to claim 6, wherein the first light exiting surface of the first lens and the second light exiting surface of the second lens have the same curvature to each other, wherein the first lens and the second lens constitute an integrated lens having a continuous incident surface comprising surfaces having different angles, and wherein the light exiting surface includes the first light exiting surface and the second light exiting surface by forming a divider between the rotation angle range of the first lens and the rotation angle range of the second lens with respect to the central axis of the emission center to make the angles of the optical axes of the respective lenses different from each other in the vertical direction.

8. The light-emitting module according to claim 1, wherein the angle of the optical axis of the second lens in the vertical direction is smaller than the angle of the optical axis of the first lens in the vertical direction.

9. The light-emitting module according to claim 1, wherein the light-emitting elements of the light source unit are located below an area where a lens convex vertex of the projection lens is positioned in the vertical direction.

10. The light-emitting module according to claim 1, wherein the plurality of light-emitting elements of the light source unit are aligned in a row in the horizontal direction at a regular interval between each thereof.

11. The light-emitting module according to claim 1, wherein the plurality of light-emitting elements of the light source unit are aligned in a plurality of rows at a regular interval between each thereof in the horizontal direction and the vertical direction.

12. A vehicle lamp comprising the light-emitting module according to claim 1 configured as a high-beam module separately provided from a low-beam module.

13. The vehicle lamp according to claim 12, wherein the light-emitting module further comprises:

a support substrate to which a mounting board provided with the light-emitting elements mounted on or above the mounting board is connected; and a heat sink connected to the support substrate.

14. The vehicle lamp according to claim 13, wherein the support substrate is larger in area than the projection lens, and wherein the projection lens is detachably disposed on the support substrate using the frame body.

* * * * *